United States Patent
Erdtmann

(10) Patent No.: US 11,873,041 B2
(45) Date of Patent: Jan. 16, 2024

(54) RUBBER TRACK

(71) Applicant: JOSEPH VOEGELE AG, Ludwigshafen/Rhein (DE)

(72) Inventor: Bernhard Erdtmann, Mannheim (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 245 days.

(21) Appl. No.: 17/215,899

(22) Filed: Mar. 29, 2021

(65) Prior Publication Data

US 2021/0300488 A1 Sep. 30, 2021

(30) Foreign Application Priority Data

Mar. 30, 2020 (EP) ..................................... 20166575

(51) Int. Cl.
*B62D 55/24* (2006.01)
*B62D 55/15* (2006.01)
*B62D 55/092* (2006.01)

(52) U.S. Cl.
CPC ........... *B62D 55/242* (2013.01); *B62D 55/15* (2013.01); *B62D 55/092* (2013.01)

(58) Field of Classification Search
CPC ..... B62D 55/242; B62D 55/15; B62D 55/092
See application file for complete search history.

(56) References Cited

U.S. PATENT DOCUMENTS

| | | | | |
|---|---|---|---|---|
| 3,730,013 A | * | 5/1973 | Slemmons | F16F 15/14 74/574.3 |
| 4,607,892 A | * | 8/1986 | Payne | B62D 55/145 305/137 |
| 5,141,299 A | | 8/1992 | Korpi | |
| 6,206,492 B1 | * | 3/2001 | Moser | B62D 55/104 180/9.5 |
| 8,398,182 B2 | * | 3/2013 | Simula | B62D 55/145 305/193 |

(Continued)

FOREIGN PATENT DOCUMENTS

| | | |
|---|---|---|
| CN | 103930243 A | 7/2014 |
| CN | 215904633 U | 2/2022 |

(Continued)

OTHER PUBLICATIONS

Michael F. Ashby, Excerpt-Chapter 4: Material Property Charts, Materials Selection in Mechanical Design Book, Feb. 1, 2014 (Year: 2014).*
European Search Report dated Mar. 11, 2020, Application No. 20166575.9, 2 Pages.
Chinese Search Report (with English Machine Translation) dated Nov. 13, 2022, Application No. 202110338034.1, Applicant Joseph Voegele AG, 6 Pages.

(Continued)

*Primary Examiner* — Scott A Browne
(74) *Attorney, Agent, or Firm* — BROOKS KUSHMAN P.C.

(57) ABSTRACT

A rubber track, in particular for a road paver or a feeder vehicle, comprising at least one drive wheel and at least one guide wheel, which are placed on a carrier together with wheels arranged in pairs and a rubber track, wherein the wheels have rims, and wherein on a circumferential surface of the rims of the wheels a rubber lining is attached, wherein a guide cam is provided on an inner side of the rubber track, which guide cam is configured to penetrate into an intermediate space between two wheels located next to each other, wherein a contact surface of the wheels facing the guide cam has an insert detachably attached to the rims.

19 Claims, 8 Drawing Sheets

(56) References Cited

U.S. PATENT DOCUMENTS

| | | | |
|---|---|---|---|
| 9,033,431 B1 * | 5/2015 | Zuchoski | ............... B62D 55/08 |
| | | | 305/130 |
| 9,399,285 B2 | 7/2016 | Yazawa et al. | |
| 10,059,390 B2 * | 8/2018 | Gustafson | ............ B62D 55/145 |
| 2009/0102282 A1 * | 4/2009 | Weiser | ................... B62D 55/14 |
| | | | 305/165 |
| 2011/0298274 A1 | 12/2011 | Simula et al. | |
| 2016/0031500 A1 | 2/2016 | Renson et al. | |
| 2019/0047643 A1 | 2/2019 | Gustafson | |
| 2021/0300488 A1 | 9/2021 | Erdtmann | |

FOREIGN PATENT DOCUMENTS

| | | | |
|---|---|---|---|
| DE | 40 13 541 A1 | 10/1991 | |
| DE | 102014006517 A1 * | 11/2014 | ........... A01D 51/002 |
| TW | 200927355 A | 7/2009 | |
| WO | 2006/032107 A1 | 3/2006 | |

OTHER PUBLICATIONS

Chinese Office Actiont (with English Machine Translation) dated Nov. 18, 2022, Application No. 202110338034.1, Applicant Joseph Voegele AG, 9 Pages.

Chinese Search Report (with English Machine Translation) dated Apr. 5, 2023, Application No. 202110338034.1, 5 Pages.

Chinese Second Office Action (with English Machine Translation) dated Apr. 17, 2024, Application No. 202110338034.1, 10 Pages.

Chinese Search Report (with English Machine Translation) dated Aug. 4, 2023, Application No. 202110338034.1, Applicant Joseph Voegele Corporation, 5 Pages.

Chinese Third Office Action (with English Machine Translation) dated Aug. 22, 2023, Application No. 202110338034.1, Applicant Joseph Voegele Corporation, 11 Pages.

* cited by examiner

RUBBER TRACK

CROSS-REFERENCE TO RELATED APPLICATIONS

This application claims foreign priority benefits under 35 U.S.C. § 119(a)-(d) to European patent application number EP 20166575.9, filed Mar. 30, 2020, which is incorporated by reference in its entirety.

TECHNICAL FIELD

The present disclosure refers to a rubber track, in particular for a road paver or a feeder vehicle.

BACKGROUND

In a road paver or feeder, a rubber track is conventionally provided on the underside of each side. A rubber track typically includes a pair of drive wheels and a pair of guide wheels, which are coupled to a support structure along with support wheels. A rubber track wraps around the wheels. The support wheels are arranged in pairs on a rib and have rims that realize the lateral guide function on the guide cams of the rubber track. Rubber coating of the support wheels, drive wheels and guide wheels is applied to the rims, on which the wheel rolls. The problem nowadays is that the friction between the rims of the wheels and the guide cams induces heat into the wheels. This heat development, especially during longer transport runs, damages the rubber coating of the wheels. Still another problem is corrosion of the thrust surfaces of the individual wheels facing the rubber track, because the roughness on the thrust surfaces of the wheels caused by corrosion damages the guide cams of the rubber track during operation.

SUMMARY

It is the object of the disclosure to eliminate the above-mentioned problems.

This object is solved by a rubber track of the disclosure.

The rubber track according to the disclosure, in particular for a road paver or a feeder vehicle, comprises at least one drive wheel and at least one guide wheel, placed on a carrier together with support wheels arranged in pairs and a rubber track. The wheels have rims, and a rubber coating may be applied to a circumferential surface of the rims of the wheels. A guide cam is provided on an inner side of the rubber track. The guide cam is configured to penetrate into a gap between two adjacent support wheels, and a thrust, or a contact, surface of the wheels facing the guide cam may have an insert detachably attached to the rims.

This creates the possibility of configuring the wheels position-dependent and providing a low-friction material pairing between the guide cam of the rubber track and the rim, in that the insert at the friction point of the rims with the guide cams can be used with different materials, while the rest of the rim can be manufactured in a cost-effective manner from cast iron, for example. By reducing friction, the induced heat in the individual wheels can also be reduced, which, for example, reduces heat generation at the transition points of the rubber coating during longer transport runs. The insert also offers the possibility of accommodating thermal decoupling at the friction pair by means of an insert material with low thermal conductivity. It is possible for the entire insert or only a portion of the insert to have a low thermal conductivity material.

In a preferred variant, the insert is detachably attached to the rims without tools. This allows easy conversion and attachment of the inserts to the rims.

It is particularly advantageous if the insert extends radially beyond the circumferential surface of the rims. This reduces not only the friction between the rim and the rubber track, but also the lateral friction between the rubber coating of the support wheels and the rubber track.

Preferably, the insert includes a plastic material. Since plastics generally have a lower hardness than steel or iron, plastics provide friction reduction in the friction pairing of the support wheels with the rubber track. In addition, plastics also provide corrosion protection for the wheel contact surface facing the rubber track.

Preferably, the plastic material has a Shore B hardness of at least 50, so that the insert can form a low-friction pair with a rubber track.

In an advantageous embodiment, the plastic material is substantially harder than the rubber track. This optimizes the reduction of friction and induced frictional heat in the wheels.

In a preferred embodiment, the plastic material is substantially harder than the rubber coating of the wheels. This is particularly advantageous for reducing friction between the wheels and the guide cams of the rubber track.

Preferably, the insert is formed of a material that has a lower coefficient of thermal conductivity than steel or iron, for instance 25-60 $Wm^{-1}K^{-1}$. This reduces the heat induced by friction and increases the service life of the rubber coating of the wheels and of the guide cams of the rubber track. In an advantageous embodiment, the insert includes a stainless steel material. This provides further corrosion protection for the thrust surface of the wheels.

In another embodiment, the insert includes lubrication, thereby reducing friction and heat on the wheels of the rubber track.

BRIEF DESCRIPTION OF THE DRAWINGS

In the following, embodiments of the disclosure are described in more detail with reference to the figures.

DETAILED DESCRIPTION

Figure 1:
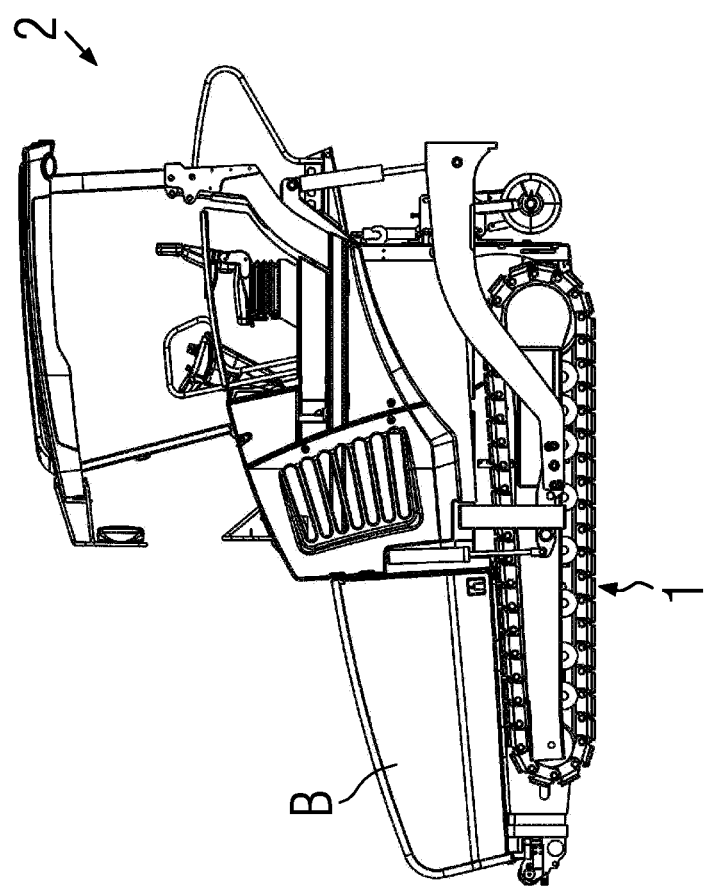
FIG. 1 shows a side view of a road paver with a rubber track.

FIG. 1 shows a road paver 2 for producing a road surface. The road paver 2 comprises a rubber track 1.

Figure 2:
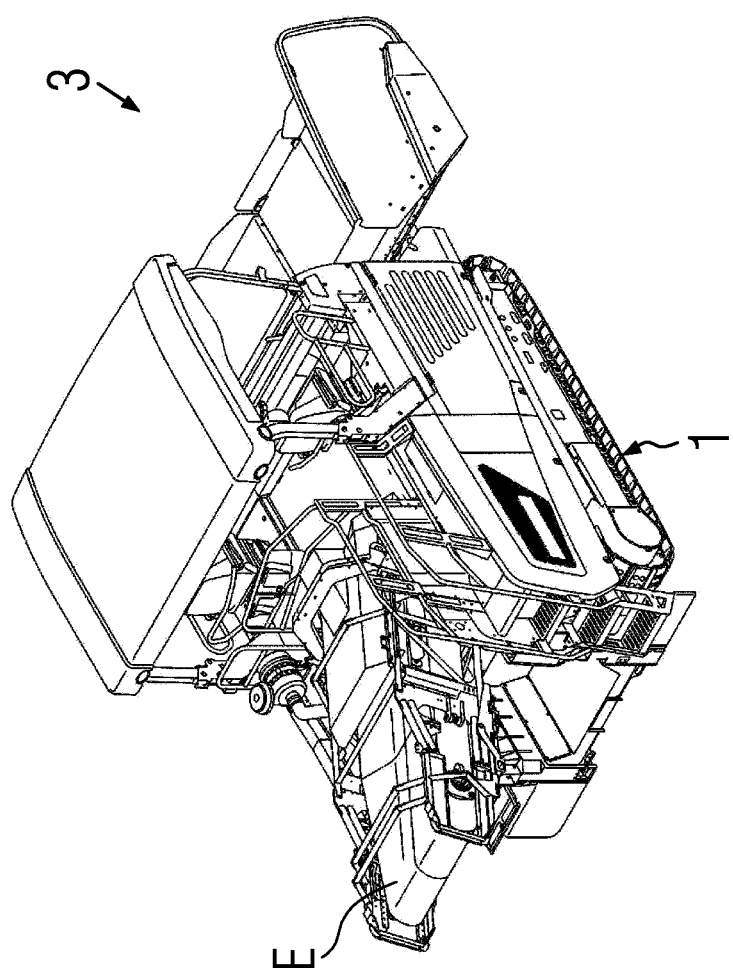
FIG. 2 shows a perspective view of a feeder vehicle with a rubber track.

FIG. 2 shows a feeder vehicle 3 that can feed an asphalt mix or other material to be applied to the road to the material hopper B of a road paver 2 via an endless conveyor belt E. The feeder vehicle 3 also has a rubber track 1.

Figure 3:
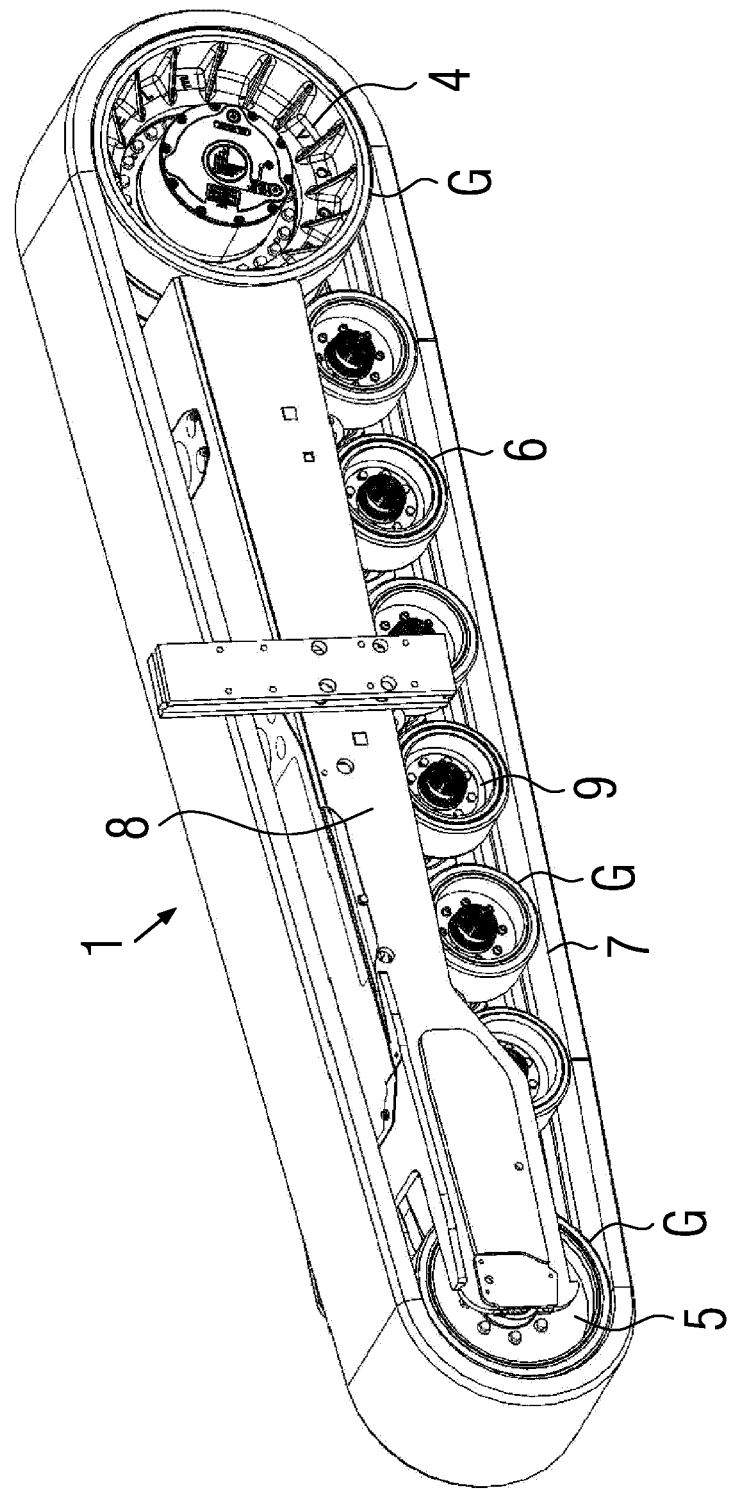
FIG. 3 shows a perspective view of a rubber track.

FIG. 3 shows the rubber track 1. The rubber track 1 includes drive wheels 4 and guide wheels 5. A rubber track 7 is clamped onto the drive wheels 4 and the guide wheels 5. The rubber track 1 further comprises a carrier 8, by means of which the rubber track 1 is attached to the road paver 2 or to the feeder vehicle 3. FIG. 3 further shows support wheels 6 arranged laterally one behind the other, which are located between the drive wheel 4 and the guide wheel 5 in order to support the running of the rubber track 7. The drive wheels 4, the guide wheels 5 and the support wheels 6 are arranged in pairs on a rib 10a (see FIG. 4).

Each wheel 4, 5, 6 has a machined rim 9 on which a rubber coating G is mounted on which the wheels 4, 5, 6 roll. It is possible that the rubber material of the rubber track 7 and the rubber coating G of the wheels 4, 5, 6 include the same type of rubber. It is also possible that the rubber material of the rubber track 7 and the rubber coating G of the wheels 4, 5, 6 include different types of rubber and have different material properties.

Figure 4:
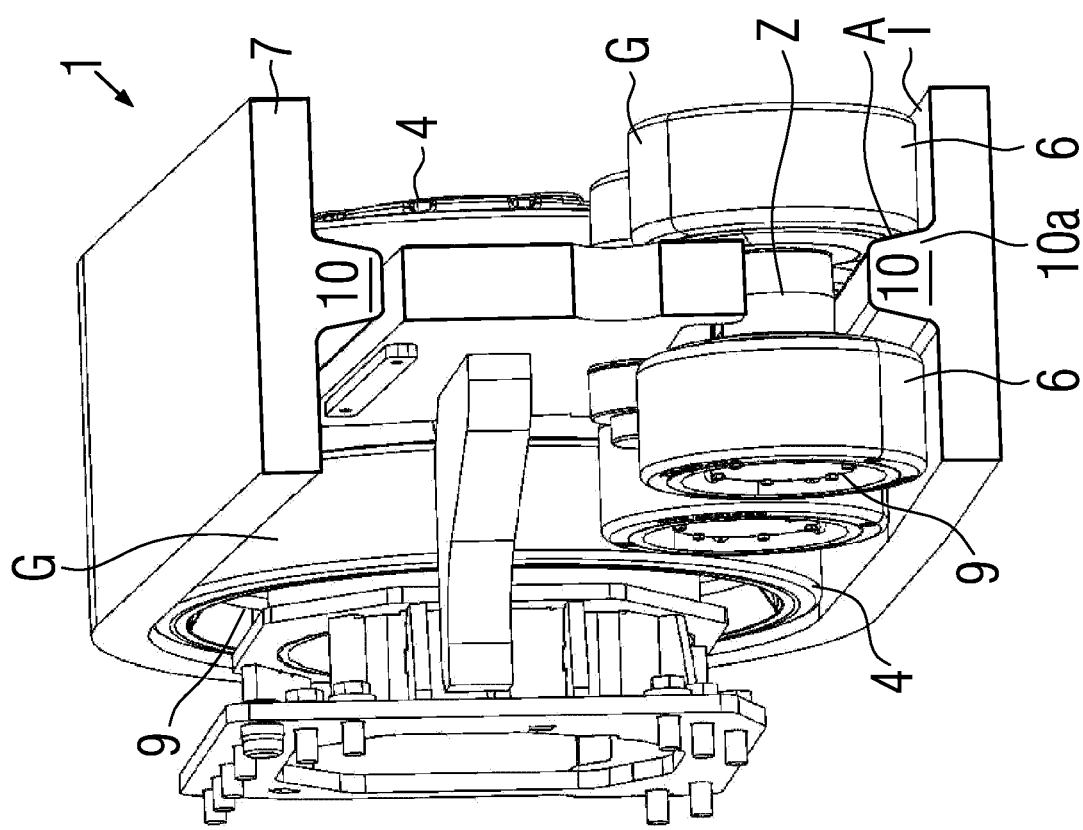
FIG. 4 shows a perspective view of a portion of the rubber track.

FIG. 4 shows a part of the rubber track 1 with drive wheels 4 and support wheels 6.

The rims 9 of the wheels 6 may be made of cast iron in a one-piece construction and a space Z is provided between two support wheels 6. A guide cam of the rubber track 7 penetrates into this intermediate space Z, which is arranged on the inner side I of the rubber track 7. The support wheels 6 have contact surfaces A facing the guide cam which form a friction pair with the rubber track 7.

Figure 5:
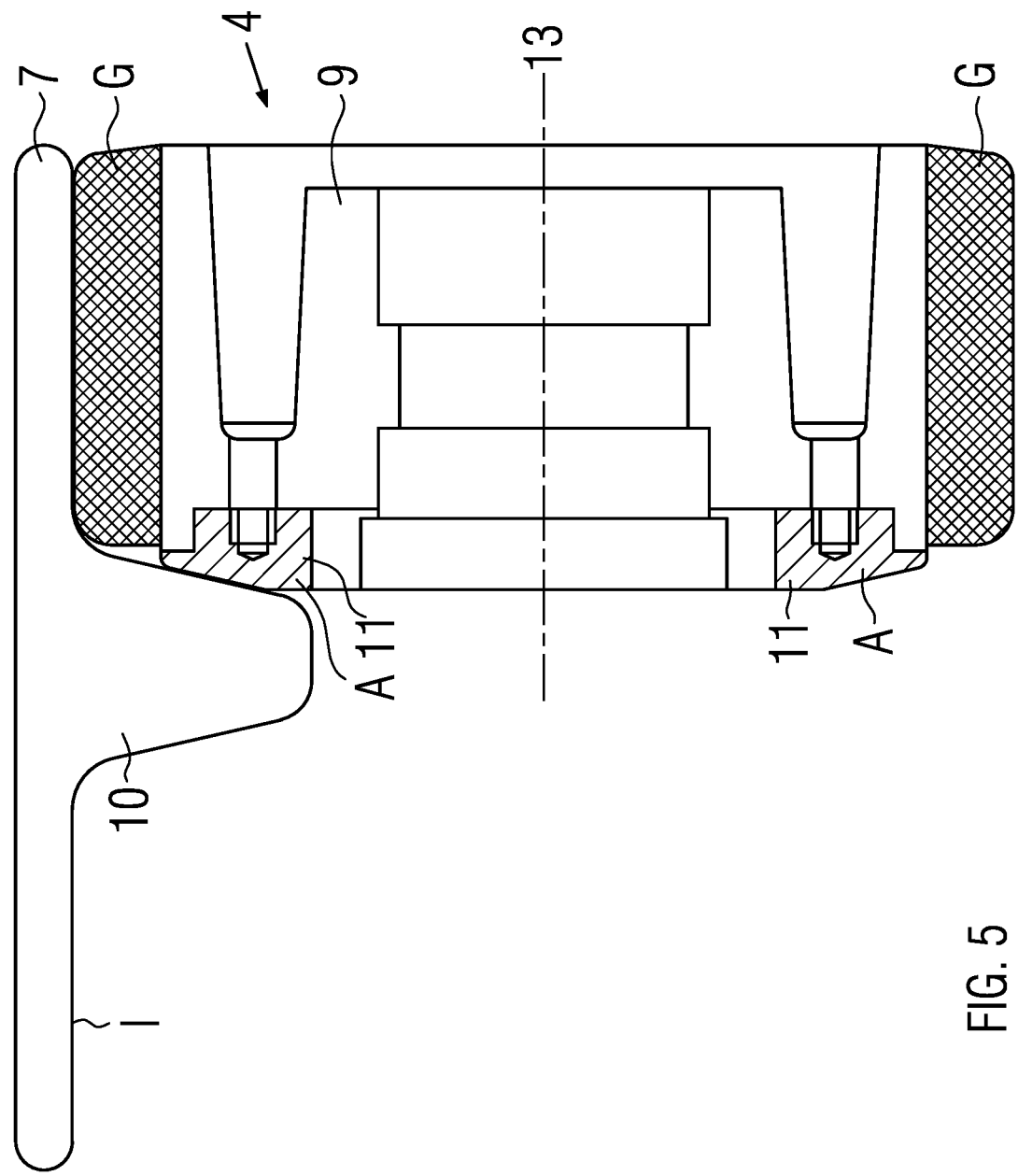
FIG. 5 shows a side view of a wheel of the rubber track with an insert extending beyond the circumferential surface of a rim.

FIG. 5 shows a vertical section of a wheel 4, 5, 6 according to the disclosure and guide cams 10 of the rubber track 7 on its inner side I. An insert 11 is provided on the rims 9 on the contact surface A of the wheels 4, 5, 6 facing the guide cams 10. The insert 11 is detachably attached to the rims 9. The insert 11 can be screwed to the rims. It is also possible to attach the insert 11 to the rims 9 without tools.

Figure 6:
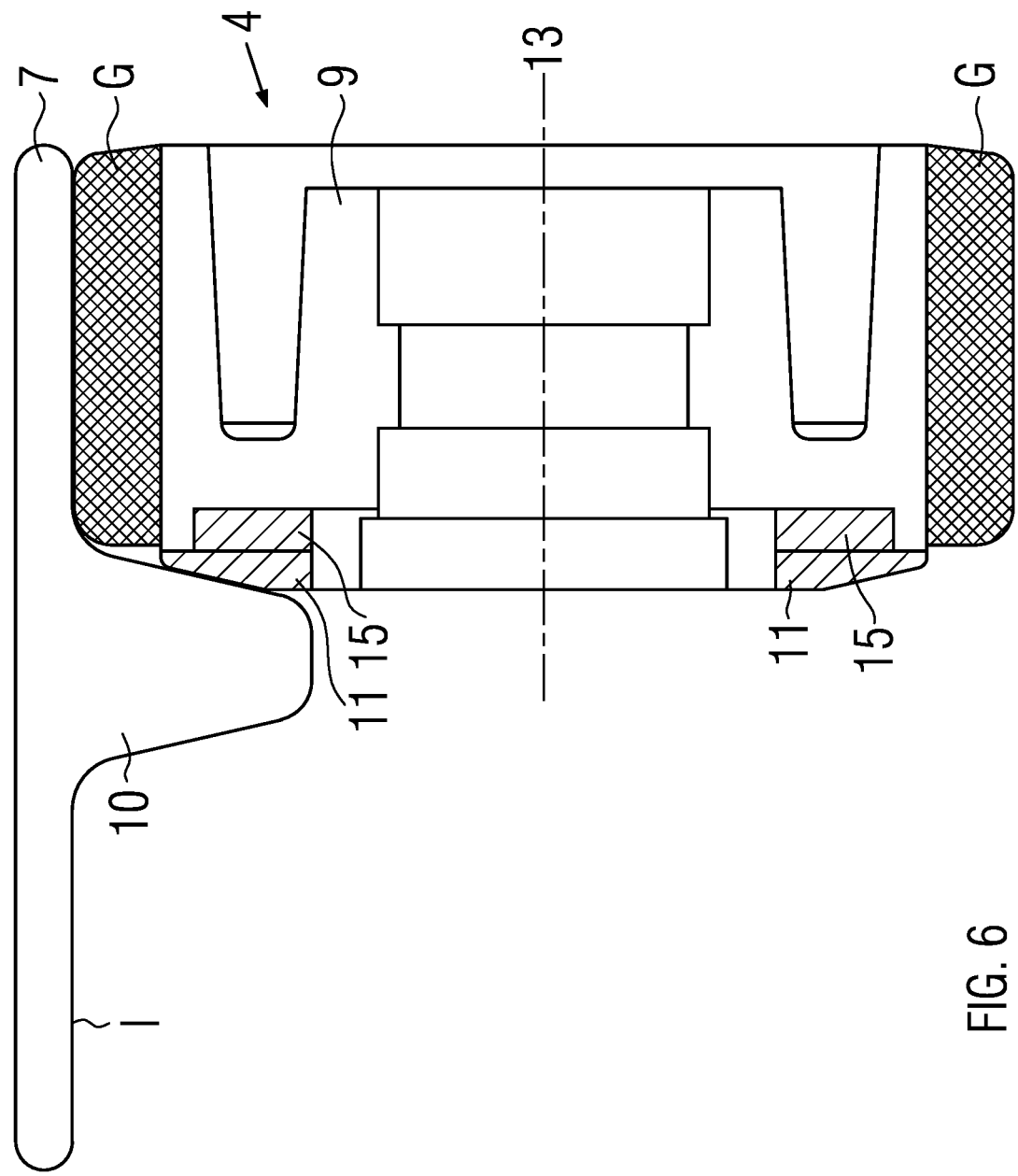
FIG. 6 shows a side view of a wheel of the rubber track with an insert extending beyond the circumferential surface of a rim in the form of a freely rotatable ring.

In an alternative embodiment, the insert 11 is rotatable about the axis 13 of the wheel 4, 5, 6 and relative to the respective rim. As shown in FIG. 6, the insert 11 in this embodiment can be formed as a freely rotatable ring. It is also possible to apply a sliding material 15 between the rim 9 and the insert 11. In particular, materials with a relatively low coefficient of thermal conductivity, for instance 0.1-55 $Wm^{-1}K^{-1}$, with respect to the rim 9 and/or the insert 11 can be used for the sliding material 15 to form a temperature decoupling between the insert 11 and the rim 9. The sliding material 15 also has the function of reducing temperature and friction induced heat between the rim and the insert 11. In particular, plastic materials such as polyamide or PTFE (polytetrafluoroethylene) may be used for the sliding material 15.

The insert 11 may include plastic material to form a better friction pair with the rubber track 7. In particular, hard plastic materials may be used for the insert 11. The plastic material of the insert 11 may have at least a Shore B hardness 50. Furthermore, the plastic material of the insert 11 preferably has substantially minimum the same hardness as the rubber material of the rubber track 7 or as the rubber coating G of the wheels 4, 5, 6. It is also possible that the insert 11 includes stainless steel material. The insert material may have a lower coefficient of thermal conductivity than cast iron, for instance 25-60 $Wm^{-1}K^{-1}$. In order to form a low-friction material pairing between the rubber track 7 and the wheels 4, 5, 6, it is also possible to lubricate the insert 11 with a lubricant, in particular a dry lubricant, or a lubricating varnish of polytetrafluoroethylene or graphite.

Figure 7:
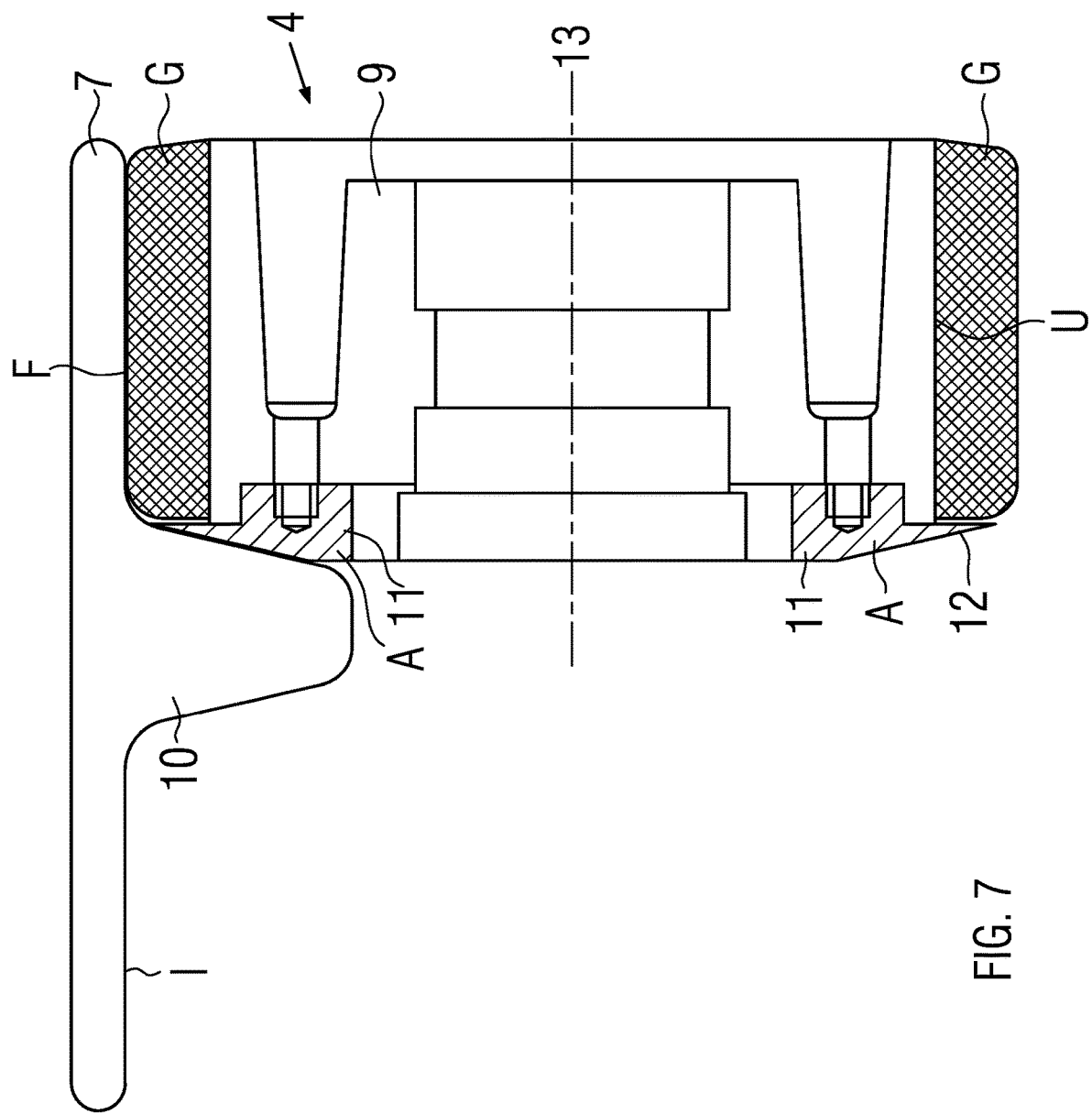
FIG. 7 shows a side view of a wheel of the rubber track with an insert extending beyond the circumferential surface of a rim and extended.

As shown in FIG. 7, the insert 11 can be extended beyond the circumferential surface U of the rim 9 to the guide surface F of the rubber track 7. This extension may be formed integrally with the insert 11, or may be attached to the insert 11 as an insert module 12. The insert 11 and the insert module 12 may include the same as well as different materials.

Figure 8:
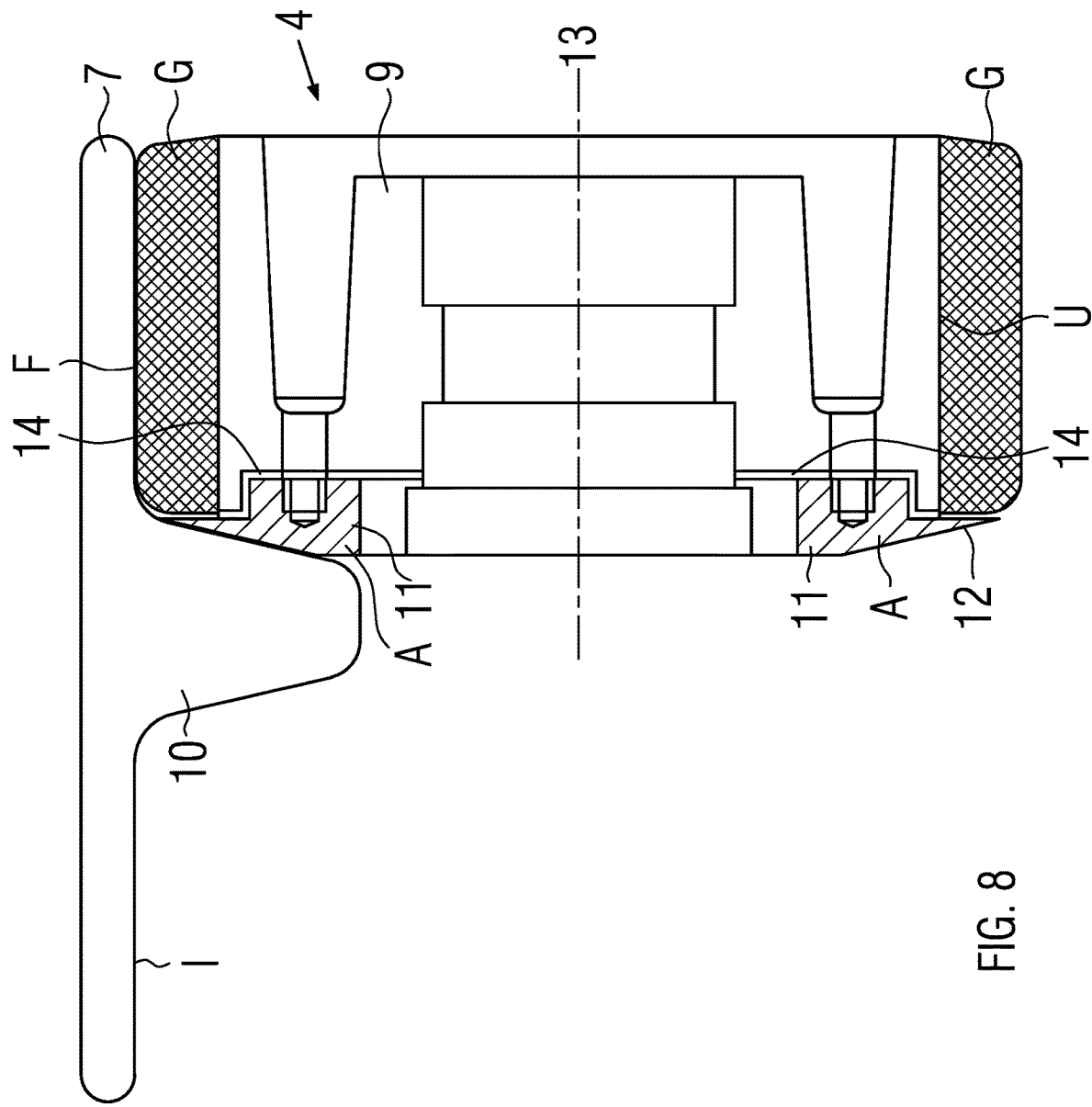
FIG. 8 shows a side view of a wheel of the rubber track with an insert extending beyond the circumferential surface of a rim and a material layer.

Alternatively, it is possible to apply a layer of material 14 between the insert 11 and the rim 9. This is illustrated in FIG. 8. The material layer 14 can be a stainless steel ring. It is also possible to form the material layer from a material having a lower thermal conductivity coefficient than the insert 11 and/or than cast iron.

What is claimed is:

1. A rubber track assembly for a road paver or a feeder vehicle, the rubber track assembly comprising:
   a pair of drive wheels and a pair of guide wheels placed on a carrier together with a pair of support wheels and a rubber track, wherein each of the wheels comprises a rim, and a rubber coating disposed on a circumferential surface of the rim,
   a guide cam disposed on an inner side of the rubber track, the guide cam being configured to penetrate into a gap between two adjacent wheels of at least one of the pairs of drive wheels or guide wheels or support wheels,
   wherein a contact surface of at least one of the two adjacent wheels facing the guide cam has an insert detachably attached to the respective rim of the wheel having the insert,
   wherein the insert is rotatable about the axis of the wheel relative to the rim.

2. The rubber track assembly according to claim 1, wherein the insert is detachably attached to the rim without tools.

3. The rubber track assembly according to claim 1, wherein the insert extends radially beyond the circumferential surface of the rim.

4. The rubber track assembly according to claim 1, wherein the insert includes a plastic material.

5. The rubber track assembly according to claim 4, wherein a Shore B hardness of the plastic material is at least 50.

6. The rubber track assembly according to claim 4, wherein the plastic material is substantially harder than the rubber track.

7. The rubber track assembly according to claim 4, wherein the plastic material is substantially harder than the rubber coating of the wheels.

8. The rubber track assembly according to claim 1, wherein the insert is formed of a material having a lower coefficient of thermal conductivity than cast iron.

9. The rubber track assembly according to claim 1, wherein the insert includes a stainless steel material.

10. The rubber track assembly according to claim 1, wherein the insert includes lubrication.

11. The rubber track assembly according to claim 1, wherein the insert comprises a self-lubrication.

12. The rubber track assembly according to claim 1, wherein the insert comprises graphite.

13. The rubber track assembly according to claim 1, wherein a material layer is provided between the insert and the rim, the material layer being formed of a material having a lower coefficient of thermal conductivity than the insert or than cast iron.

14. The rubber track assembly according to claim 8, wherein the insert is formed of a material having a coefficient of thermal conductivity of 25-60 $Wm^{-1} K^{-1}$.

15. The rubber track assembly according to claim 13, wherein the material layer has a coefficient of thermal conductivity of 0.1-55 $Wm^{-1} K^{-1}$.

16. A construction machine in the form of a road paver or in the form of a feeder vehicle, comprising a rubber track assembly according to claim 1.

17. A rubber track assembly for a road paver or a feeder vehicle, the rubber track assembly comprising:
- a pair of drive wheels and a pair of guide wheels placed on a carrier together with a pair of support wheels and a rubber track, wherein each of the wheels comprises a rim, and a rubber coating disposed on a circumferential surface of the rim,
- a guide cam disposed on an inner side of the rubber track, the guide cam being configured to penetrate into a gap between two adjacent wheels of at least one of the pairs of drive wheels or guide wheels or support wheels,
- wherein a contact surface of at least one of the two adjacent wheels facing the guide cam has an insert detachably attached to the respective rim of the wheel having the insert,
- wherein the insert is rotatable about the axis of the wheel relative to the rim; and
- wherein the insert extends radially beyond the circumferential surface of the rim.

18. A rubber track assembly for a road paver or a feeder vehicle, the rubber track assembly comprising:
- a pair of drive wheels and a pair of guide wheels placed on a carrier together with a pair of support wheels and a rubber track, wherein each of the wheels comprises a rim, and a rubber coating disposed on a circumferential surface of the rim,
- a guide cam disposed on an inner side of the rubber track, the guide cam being configured to penetrate into a gap between two adjacent wheels of at least one of the pairs of drive wheels or guide wheels or support wheels,
- wherein a contact surface of at least one of the two adjacent wheels facing the guide cam has an insert detachably attached to the respective rim of the wheel having the insert,
- wherein the insert is rotatable about the axis of the wheel relative to the rim; and
- wherein the insert includes a stainless steel material.

19. The rubber track assembly according to claim 4, wherein the plastic material is harder than the rubber track and the rubber coating of the wheels.

* * * * *